J. B. STORMS.
AUTO LIFTER.
APPLICATION FILED APR. 5, 1920.
1,383,169.
Patented June 28, 1921.
2 SHEETS—SHEET 1.
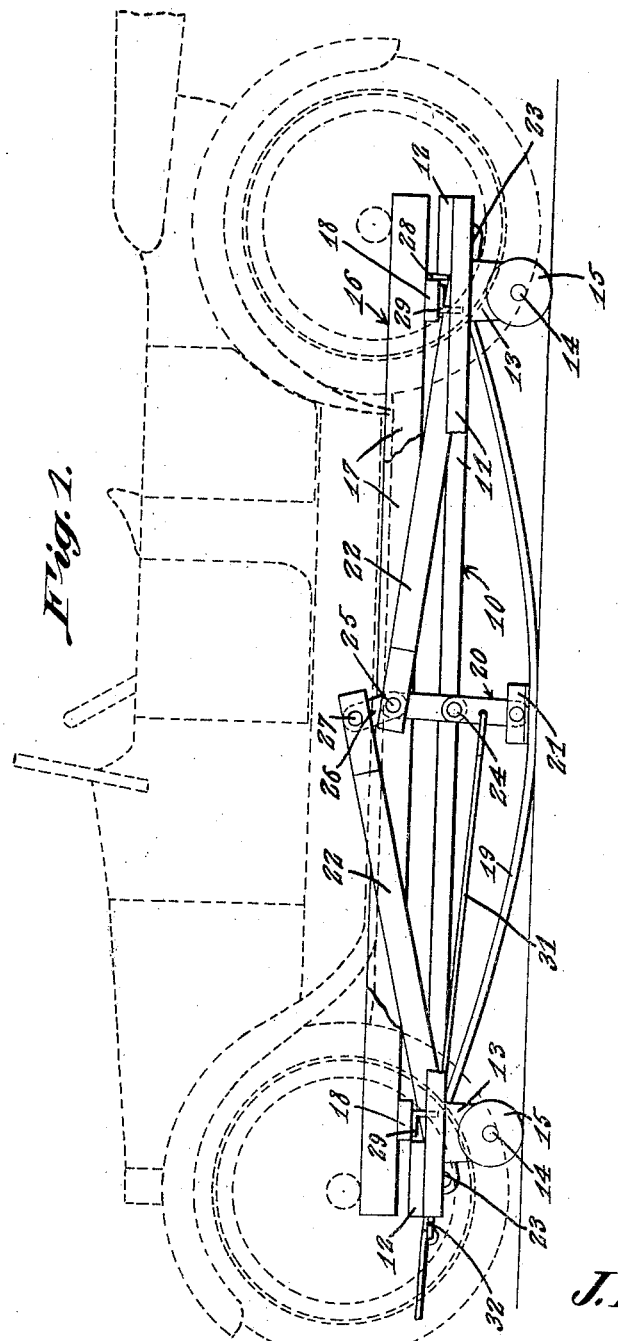
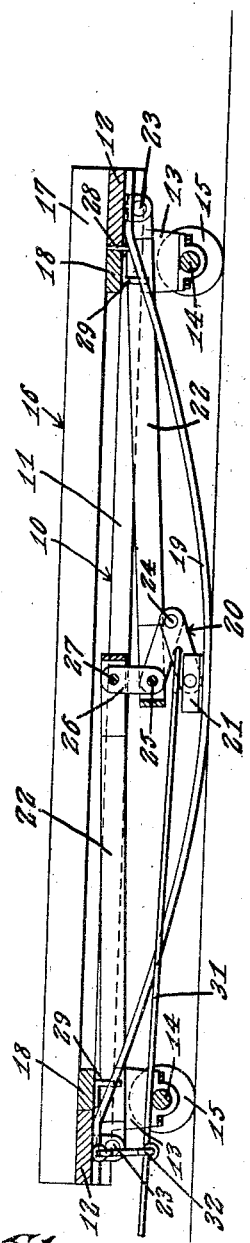
J. B. Storms, Inventor
Witness
By C. A. Snow & Co.
Attorneys

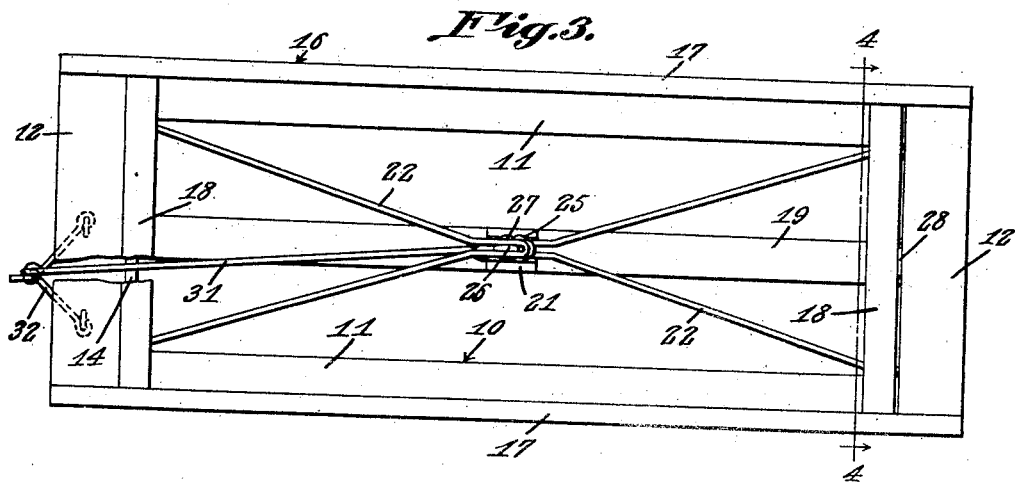
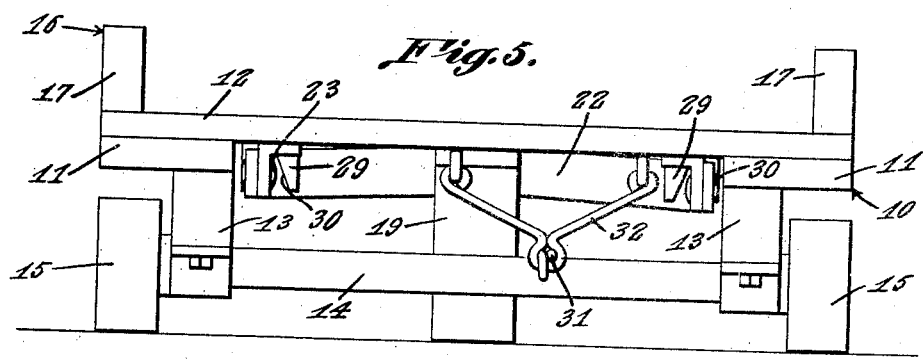
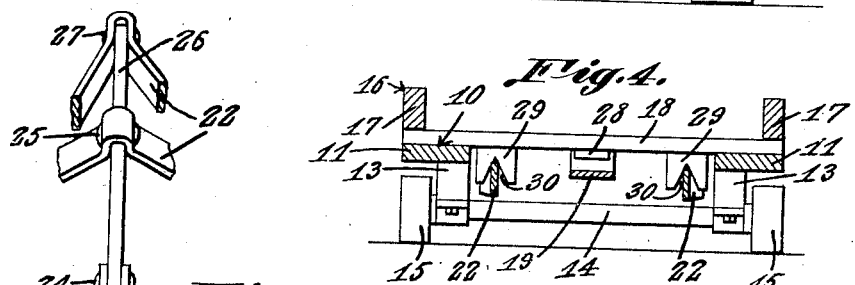
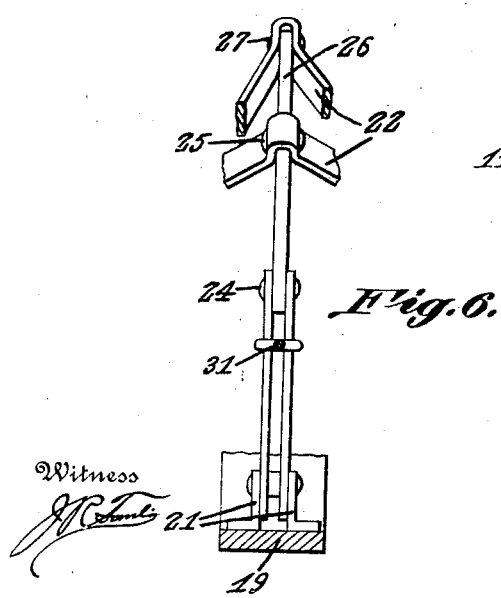

UNITED STATES PATENT OFFICE.

JESSE B. STORMS, OF LOCKPORT, NEW YORK.

AUTO-LIFTER.

1,383,169. Specification of Letters Patent. Patented June 28, 1921.

Application filed April 5, 1920. Serial No. 371,323.

*To all whom it may concern:*

Be it known that I, JESSE B. STORMS, a citizen of the United States, residing at Lockport, in the county of Niagara and State of New York, have invented a new and useful Auto-Lifter, of which the following is a specification.

This invention relates to an improved automobile lifter or jack, and the object of the invention is to provide an improved device of the above character adapted to raise an automobile by means of the front axle and the rear axle housing, from the ground, so that the tires will be relieved of the weight of the car, the device being adapted for use in garages or other places so as to permit the car to be raised off the wheels at night or otherwise.

With the above and other objects in view which will appear as the description proceeds, the invention resides in the combination and arrangement of parts and in the details of construction hereinafter described and claimed, it being understood that within the scope of what is claimed, changes in the precise embodiment of the invention shown can be made without departing from the spirit of the invention.

In the accompanying drawings:

Figure 1 is a side elevation of my improved automobile lifter or jack in an elevated position;

Fig. 2 is a vertical sectional view of the same in lowered position;

Fig. 3 is a plan view;

Fig. 4 is a transverse section taken on the line 4—4 of Fig. 3;

Fig. 5 is an end elevation; and

Fig. 6 is a detail of the operating mechanism.

Referring to the drawings in detail, in which like reference characters designate corresponding parts throughout the several views, my improved automobile lifter or jack comprises a wheeled frame 10 including side members 11 and end members 12 connecting the same at right angles so as to provide a rectangular open frame. This frame is supported at each end upon bearing blocks 13 which rest upon an axle 14 bearing the carrying wheels 15 serving to support the frame at a spaced distance from the ground.

Coöperating with the wheeled frame is a movable frame 16 comprising vertical side rails 17 mounted on edge and connected by cross members 18 which are disposed inwardly of the cross members 12 of the wheeled frame, the side rails serving to engage beneath the front axle and the rear axle housing of an automobile, it being understood that the device is made to suit the particular size of automobile to be supported or made adjustable so as to give the proper wheel base for this purpose. The ends of the vertical side rails 17 project beyond the cross members 18 and over the cross members 12 so that the movable frame may be lowered on to the wheeled frame with the members 18 resting on the side members 11 and the side rails 17 resting on the end members 11. An automobile is driven over the device in use.

Normally, the movable frame is supported upon the side rails and cross rails of the wheeled frame, and in order to raise and lower the movable frame, there is provided between the cross members 12, a downwardly bowed or arched member 19 constituting a skid adapted to engage the ground surface so as to brake the tendency of the device to travel under the impact of the movement of the vehicle or automobile. This arched member 19 is anchored at its ends to the cross members 12 and at the intermediate portion thereof, is arranged to support an articulated or toggle joint 20 comprising a pair of hinged sections secured to a bracket 21 carried by the intermediate portion of the brake.

Secured to each end or cross member 12 pivotally, is a V-shaped supporting member or lever 22, said supporting members being disposed in reversed positions so that the extremities thereof may be pivotally connected to said cross members as indicated at 23 with the restricted portions of the supporting members extending toward each other at the center of the wheeled frame and in overlapping relation. The sections of the articulated joints which are pivoted together as indicated at 24, have the upper end of the upper section pivoted to one of the supporting members 22 as indicated at 25 and the other supporting member is secured to the inner end of an upright or link 26, pivoted as shown at 27, the member 26 being in turn pivoted at 25 so that breaking of the joint to move the sections of the articulated connection downwardly, will result in the lowering of the supporting members or lever 22. When the articulated joint is straightened out, the levers will be elevated, as it is thought will be obvious.

In order to impart movement of the levers to the movable supporting frame, the rear cross member 18 of the latter is provided intermediately of its ends with brackets 28 adapted to engage the brace or arched member 19 adjacent to the extremities thereof and said cross members 18 are also provided with inverted angular brackets 29 having V-shaped recesses or notches 30 in the lower edges thereof receiving the lever leg portions therein. An operating rod 31 is connected to the lower section of the articulated joint and to a pivoted yoke 32 suspended beneath the cross member at the opposite end of the frame. By this means, the projecting end of the rod may be operated to extend or break the articulated joint. Thus, by pulling outwardly on the rod, the joint will be extended to raise levers and thereby raise the movable frame in contact with the front axle and rear axle housing to elevate the automobiles or other vehicles from the tires thereof. By moving the rod in the opposite direction, the levers will be swung downwardly on their pivots, thus permitting the movable frame to drop and permit the wheels of the vehicle to rest on the ground so that it may be driven off.

This machine is to be mounted on casters so that when the auto lifter raises an automobile, the automobile can be whirled around any place in the garage.

Having thus described the invention, what I claim is:

1. An automobile jack comprising a wheeled frame, a movable frame mounted thereon and provided with means to engage beneath the front axle and rear axle housing of an automobile, a downwardly bowed member having its ends connected to the movable frame, levers pivoted to the wheeled frame and adapted to move with respect thereto, a toggle joint, having connection with the levers and means for operating the toggle joint to move the levers and cause pressure to be exerted on the downwardly bowed member and to cause the toggle joint to raise the levers and movable frame.

2. An automobile jack comprising a wheeled frame, a movable frame mounted thereon and provided with means to engage beneath the front axle and rear axle of the automobile, a skid positioned under the wheeled frame, pivoted levers for moving the movable frame, and means engaging the skid and pivoted levers for raising the movable frame and simultaneously forcing the skid into engagement with the ground surface.

3. An automobile jack comprising a wheeled frame including side members and cross members connecting said side members, a movable frame including side rails and cross members connecting the same inwardly of the cross members of the wheeled frame, an arched brace connecting the cross members of the wheeled frame intermediately of the width thereof, levers of V-shaped form having the ends thereof pivoted beneath said cross members of the wheeled frame, a connection between the inner ends of the levers, an articulated joint pivoted to the arch member intermediately of the ends thereof and having connection with the inner end of one of said levers thereof, brackets suspended from the cross members of the movable frame and having V-shaped notches receiving side portions of the levers therein, a rod connected to one of the sections of the articulated joints and a yoke pivotally suspending said rod, whereby shifting of the rod inwardly and outwardly will result in the breaking or extending of the articulated joint, to lower or raise the levers whereby to raise or lower the movable frame, substantially in the manner as and for the purposes specified.

In testimony that I claim the foregoing as my own, I have hereto affixed my signature in the presence of two witnesses.

JESSE B. STORMS.

Witnesses:
GEORGE TOWNSEND,
LUCIUS PORTER.